United States Patent
Kawamura et al.

(10) Patent No.: US 12,290,970 B2
(45) Date of Patent: May 6, 2025

(54) APPARATUS FOR PRODUCING RESIN MOLDED ARTICLE, METHOD FOR PRODUCING RESIN MOLDED ARTICLE, AND RESIN MOLDED ARTICLE

(71) Applicant: NISSEI ASB MACHINE CO., LTD., Nagano (JP)

(72) Inventors: Ryo Kawamura, Nagano (JP); Masayuki Usami, Nagano (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 477 days.

(21) Appl. No.: 17/620,991

(22) PCT Filed: Jun. 26, 2020

(86) PCT No.: PCT/JP2020/025173
§ 371 (c)(1),
(2) Date: Mar. 30, 2022

(87) PCT Pub. No.: WO2020/262595
PCT Pub. Date: Dec. 30, 2020

(65) Prior Publication Data
US 2022/0355519 A1    Nov. 10, 2022

(30) Foreign Application Priority Data
Jun. 28, 2019  (JP) ................ 2019-121680

(51) Int. Cl.
B29C 45/16    (2006.01)
B29C 45/14    (2006.01)
(Continued)

(52) U.S. Cl.
CPC .... *B29C 45/1671* (2013.01); *B29C 45/14598* (2013.01); *B29C 49/071* (2022.05); *B29C 2045/1693* (2013.01); *B29L 2009/001* (2013.01)

(58) Field of Classification Search
CPC ............ B29C 49/071; B29C 45/14598; B29C 2045/1693; B29C 45/1671;
(Continued)

(56) References Cited

U.S. PATENT DOCUMENTS 6,548,133 B2 * 4/2003 Schmidt ............... B65D 1/0215
264/513
9,067,709 B2    6/2015 Furusawa
(Continued)

FOREIGN PATENT DOCUMENTS

EP    2998240 B1 *  5/2017 ......... B29C 45/1684
EP    3 438 012      2/2019
(Continued)

OTHER PUBLICATIONS

Mechanical translation of WO-2021065705-A1 (Year: 2021).*
(Continued)

*Primary Examiner* — Robert B Davis
(74) *Attorney, Agent, or Firm* — GREENBLUM AND BERNSTEIN, P.L.C.

(57) ABSTRACT

A production apparatus of a two-layer preform including an inner layer preform and an outer layer preform includes: an outer layer cavity mold for injection-molding the outer layer preform. A bottom surface of the outer layer cavity mold is provided with a protrusion for separating the inner layer preform disposed in the outer layer cavity mold from the bottom surface.

3 Claims, 8 Drawing Sheets

(51) Int. Cl.
B29C 49/00 (2006.01)
B29L 9/00 (2006.01)

(58) Field of Classification Search
CPC .... B29C 2949/3016; B29C 2949/3034; B29C 2949/3094
See application file for complete search history.

(56) References Cited

U.S. PATENT DOCUMENTS

| | | | |
|---|---|---|---|
| 2010/0092711 A1 | 4/2010 | Atance Orden et al. | |
| 2010/0200586 A1 | 8/2010 | Furusawa | |
| 2012/0187067 A1 | 7/2012 | Maas et al. | |
| 2012/0328814 A1 | 12/2012 | Atance Orden et al. | |
| 2016/0375608 A1* | 12/2016 | Pijls | B29B 11/14 215/370 |
| 2019/0031386 A1 | 1/2019 | Ishii et al. | |
| 2019/0291331 A1* | 9/2019 | Hong | B29C 45/374 |

FOREIGN PATENT DOCUMENTS

| | | | | |
|---|---|---|---|---|
| JP | H 11-90975 A | | 4/1999 | |
| JP | 2000-043126 A | | 2/2000 | |
| JP | 2009-007060 A | | 1/2009 | |
| JP | 2010-82916 A | | 4/2010 | |
| JP | 5267901 B2 | | 5/2013 | |
| JP | 2014-069875 A | | 4/2014 | |
| JP | 2018-062146 A | | 4/2018 | |
| WO | WO-2021065705 A1 | * | 4/2021 | ............. B29B 11/08 |

OTHER PUBLICATIONS

Mechanical translation of EP-2998240-B1 (Year: 2017).*
Office Action issued Apr. 26, 2023 in Chinese family member application No. 202080045732.6. This document is being submitted for its characterization of the documents cited therein as Category "X", "Y", "A", etc. and the Examiner's consideration of this aspect of the document is respectfully requested. See p. 8, second entry in particular.
International Search Report and Written Opinion of the International Searching Authority issued in International Pat. Appl. No. PCT/JP2020/025173, dated Aug. 25, 2020, along with an English translation thereof.
Supplementary European Search Report issued Jul. 18, 2023 in family member European application No. 20831592.9.

* cited by examiner

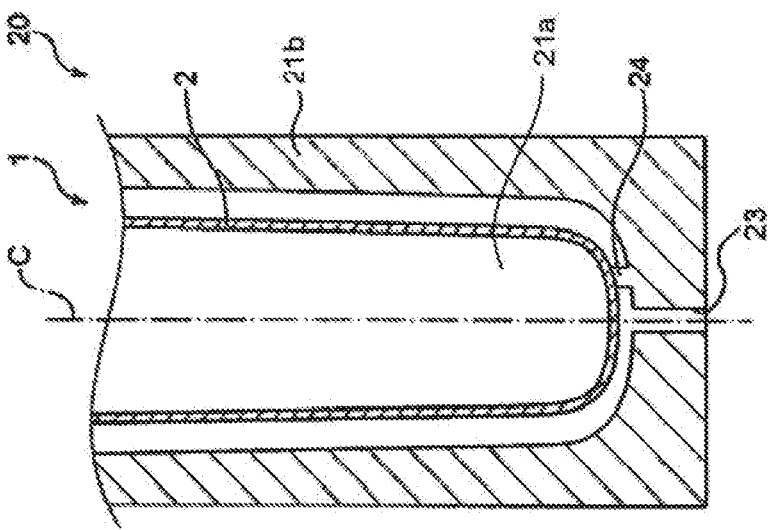
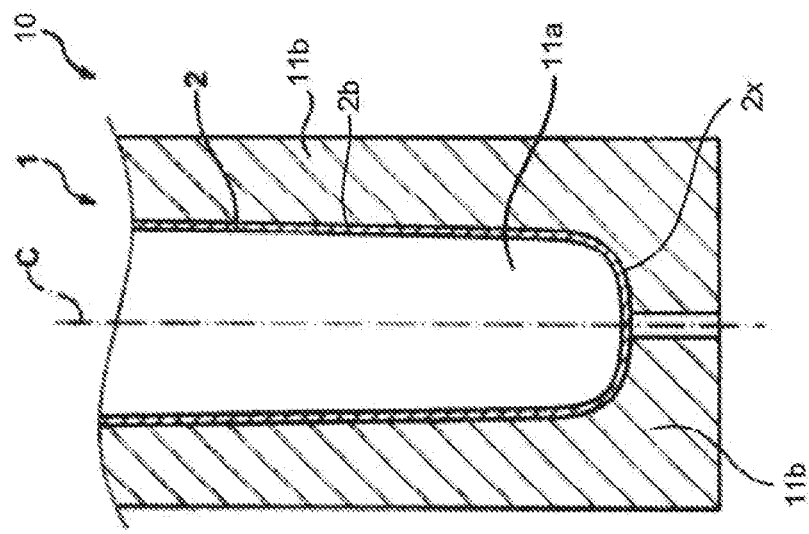

APPARATUS FOR PRODUCING RESIN MOLDED ARTICLE, METHOD FOR PRODUCING RESIN MOLDED ARTICLE, AND RESIN MOLDED ARTICLE

BACKGROUND OF THE INVENTION

Field of the Invention

The present invention relates to a production apparatus of a resin molded article having a two-layer structure and having an inner layer bottle peelable in an outer layer bottle, a production method of a resin molded article, a preform corresponding thereto, and a resin molded article.

Description of the Related Art

Conventionally, a resin molded article having a two-layer structure in which an inner layer bottle on an inner side can be peeled off in an outer layer bottle on an outer side, a production apparatus of the resin molded article, a production method of the resin molded article, and a preform corresponding thereto are known. A delamination container which is a resin molded article produced by this type of production apparatus is configured such that two bottles each having a body portion and a bottom portion are an inner and outer two-layer type, and a discharge plug such as a pump or a check valve is fixed to a neck portion (see, for example, JP 2018-62146 A, JP 2010-82916 A and Japanese Patent No. 5267901).

Examples of the delamination container include an airless pump container used for cosmetics and the like, and a squeeze container used for soy sauce, eye drops, and the like. The delamination container is designed such that the inner layer bottle is sealed to suppress the intrusion of outside air and is crushed to be reduced in volume when the contents are poured out. Therefore, the inner layer bottle is peeled off from the outer layer bottle by allowing outside air to flow between the inner layer bottle and the outer layer bottle through a vent hole or the like provided in the outer layer bottle. Accordingly, the delamination container can prevent deterioration of the contents of the inner layer bottle by sealing, and the contents of the inner layer bottle can be used up by crushing the inner layer bottle.

Currently, many delamination containers are produced by an extrusion blow type blow-molding method. In addition, some of the delamination containers are produced by a cold parison type blow-molding method using a fitting preform configured as a two-layer type by simply fitting and stacking an inner layer preform and an outer layer preform produced by separate apparatuses or places, a hot parison type blow-molding method in which one of the inner layer preform and the outer layer preform is used as an insert material and the other is injection-molded, or the like.

However, in the production apparatus according to the related arts, there has not been proposed an apparatus capable of producing a two-layer delamination container at a time by injection-molding and blow-molding a two-layer preform with one hot parison type blow-molding apparatus. Examples of the reason for this include (1) the inner layer preform and the outer layer preform are easily unbonded during blow-molding, (2) when the contents are consumed, the inner layer bottle reduced in volume and shrunk is easily detached (easily removed) from the outer layer bottle, and (3) it is difficult to form a vent hole for peeling off the inner layer bottle and the outer layer bottle. Therefore, in general, a method using a normal extrusion blow type blow-molding method is mainly used for producing the delamination container although the appearance, dimensional accuracy, and physical properties of the delamination container can be improved, and the environmental load can be reduced due to a reduction in wasted materials when the delamination container is produced by a stretch blow-molding method in which a preform is stretched in a longitudinal direction with a stretch rod and then expanded with compressed air. In addition, the delamination container by the extrusion blow-molding method is generally not excellent in dimensional accuracy and appearance quality of the neck portion and the like. In the delamination container such as the squeeze container or the airless pump container, airtightness between the neck portion of the inner layer bottle and an extraction plug is important from the viewpoint of preventing deterioration of contents and reducing the remaining amount. However, the delamination container with poor dimensional accuracy in the neck portion or the like formed by the extrusion blow-molding method may not be able to form sufficient airtightness. This causes a problem that the contents are easily deteriorated in the squeeze container, and the contents cannot be consumed in the airless pump container.

In general, in a case where the delamination container is produced by a cold parison type stretch blow-molding method, two preforms having different shapes corresponding to the inner layer preform and the outer layer preform are required. Accordingly, it is necessary to produce the inner layer preform and the outer layer preform in advance by an injection-molding machine separate from the blow-molding machine, and a production cost is high, or the productivity is low. However, a method of molding a material into the delamination container only with a hot parison type blow-molding apparatus in which the injection-molding machine and the blow-molding machine are combined without using a separate injection-molding machine is difficult for the above-described reasons.

SUMMARY OF THE INVENTION

The present invention is a production apparatus of a two-layer preform including an inner layer preform and an outer layer preform. The production apparatus includes: an outer layer cavity mold for injection-molding the outer layer preform. A bottom surface of the outer layer cavity mold is provided with a protrusion for separating the inner layer preform disposed in the outer layer cavity mold from the bottom surface.

In this case, the production apparatus may further include: a neck mold that molds a neck portion of the preform. A shape of a mold surface of the neck mold when the inner layer preform is injection-molded may be different from a shape of the mold surface when the outer layer preform is injection-molded. An abutting surface which is narrowed around an axis of the inner layer preform and abuts on the outer layer preform may be formed between a neck portion and a body portion of the inner layer preform.

Further, the present invention is a production method of a two-layer preform including an inner layer preform and an outer layer preform. The production method includes: injection-molding the inner layer preform; disposing the injection-molded inner layer preform in an outer layer cavity mold for injection-molding the outer layer preform; and injection-molding the outer layer preform on an outer surface of the inner layer preform. A bottom surface of the outer layer cavity mold is provided with a protrusion for separating the inner layer preform disposed in the outer layer cavity mold from the bottom surface.

In this case, the production method may further include: changing a shape of a mold surface of a neck mold which molds a neck portion of the preform before disposing the inner layer preform. In injection-molding the inner layer preform, an abutting surface which is narrowed around an axis of the inner layer preform between a neck portion and a body portion of the inner layer preform and abuts on the outer layer preform may be formed in the inner layer preform.

The present invention is a resin molded article. The resin molded article has a two-layer structure including an inner layer bottle molded from an inner layer preform and an outer layer bottle molded from an outer layer preform, and a through-hole is formed in a bottom portion of the outer layer bottle.

In this case, an abutting surface which is narrowed around an axis of the inner layer bottle and abuts on the outer layer bottle may be formed between a neck portion and a body portion of the inner layer bottle.

Further features of the present invention will become apparent from the following description of exemplary embodiments with reference to the attached drawings.

BRIEF DESCRIPTION OF DRAWINGS

FIG. 2A illustrates a cross-sectional view in which an inner layer cavity mold is injection-molded, FIG. 2B illustrates a cross-sectional view in which an inner layer preform is disposed in an outer layer cavity mold, and FIG. 2C illustrates a cross-sectional view of the preform.

DESCRIPTION OF THE EMBODIMENTS

Hereinafter, preferred embodiments of the present invention will be described with reference to the drawings.

Figure 1:
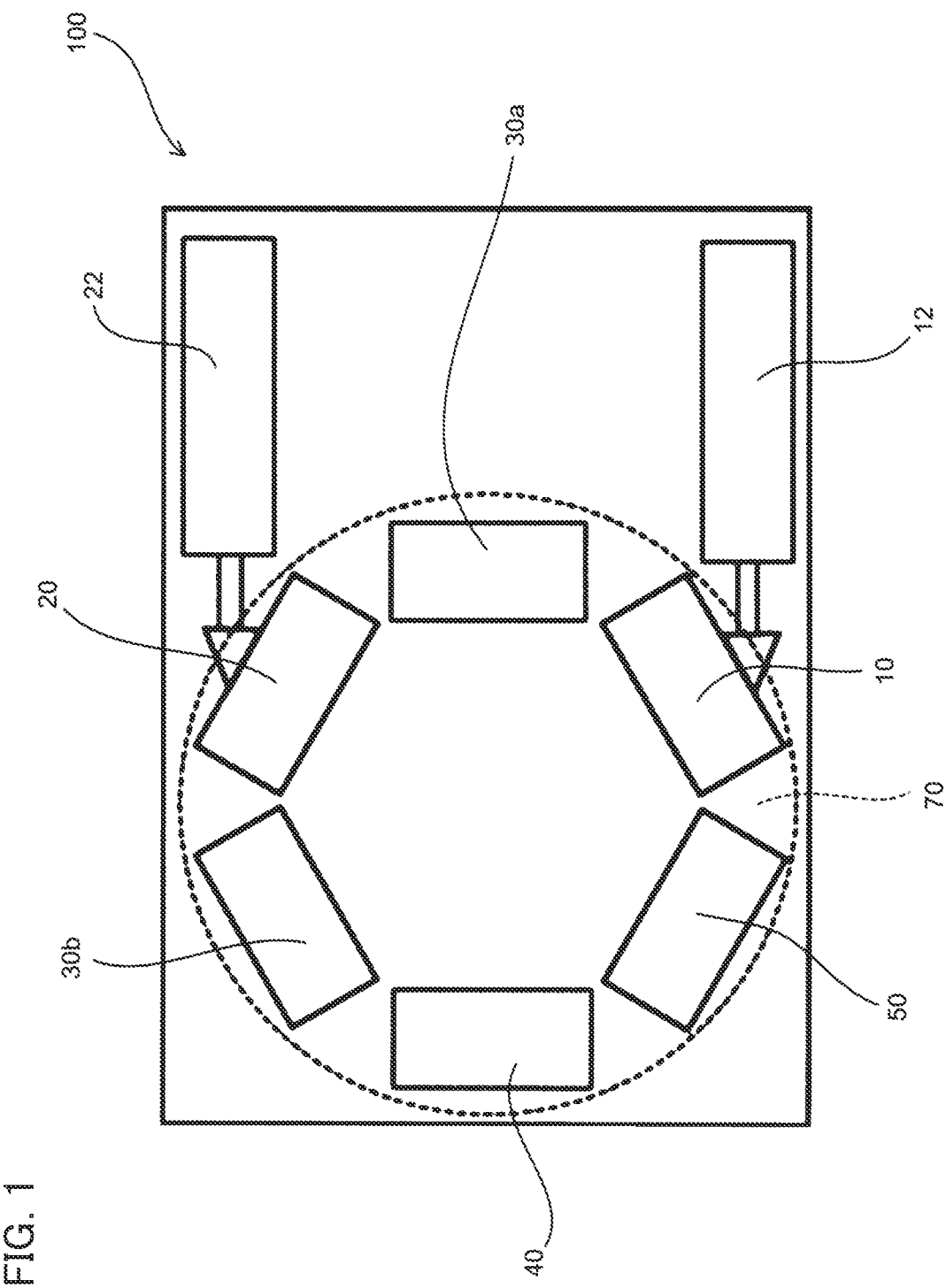
FIG. 1 is a schematic view of a blow-molding apparatus according to an embodiment of the present invention.
Figure 3:
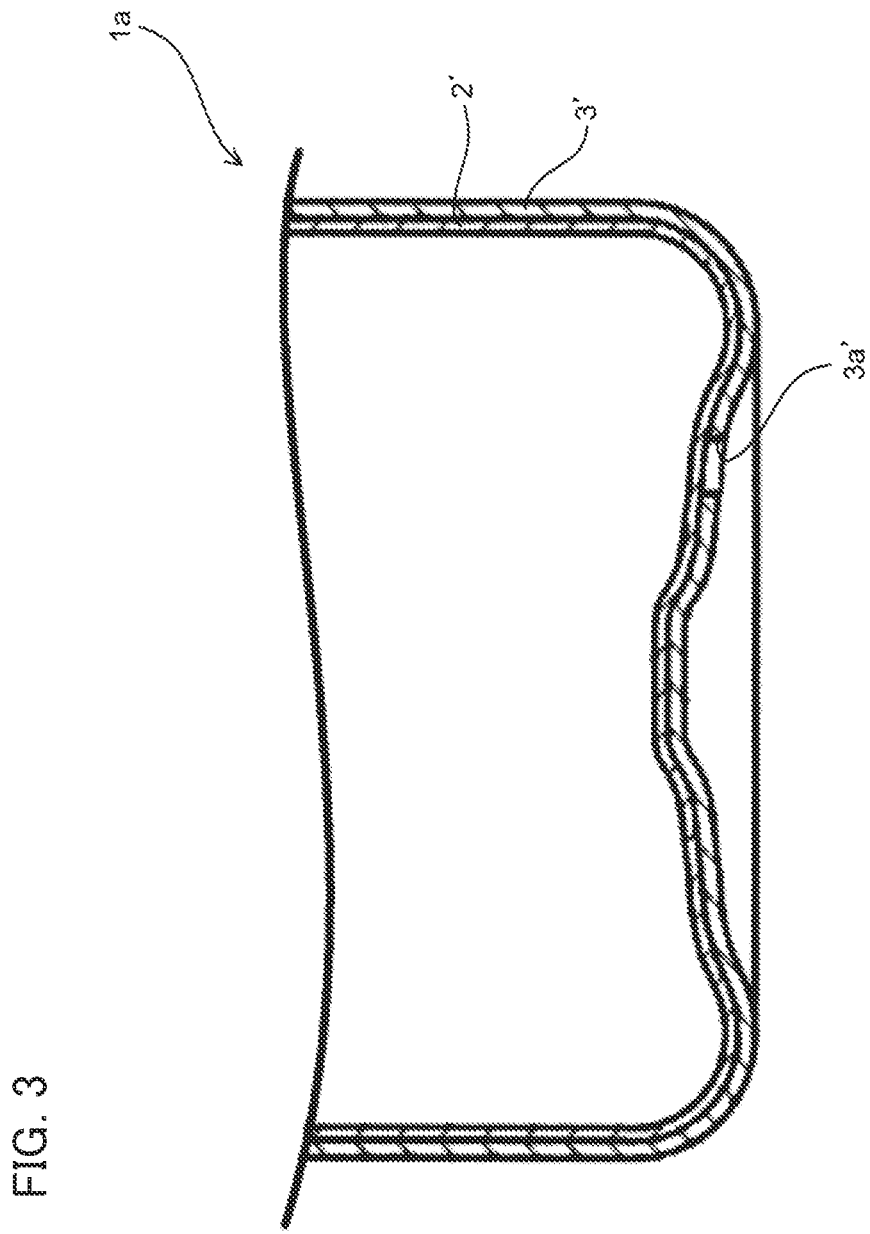
FIG. 3 is a cross-sectional view of a lower portion of a container.

FIG. 1 is a schematic view of a production apparatus according to an embodiment of the present invention. FIG. 2A illustrates a cross-sectional view in which an inner layer preform is injection-molded in an inner layer cavity mold, FIG. 2B illustrates a cross-sectional view in which the inner layer preform is disposed in an outer layer cavity mold, and FIG. 2C illustrates a cross-sectional view of the preform. FIG. 3 illustrates a cross-sectional view of a lower portion of a container.

As illustrated in FIG. 1, a production apparatus (blow-molding apparatus) 100 includes a first injection molding unit 10, a second injection molding unit 20, a first temperature adjustment unit 30a, a second temperature adjustment unit 30b, a blow-molding unit 40, and a take-out unit 50, and is a production apparatus of a container 1a a by injection-molding a preform 1 (see FIGS. 2A to 2C) and then blow-molding the preform 1. Incidentally, the first temperature adjustment unit 30a may be omitted. In this case, the production apparatus 100 includes the first injection molding unit 10, the second injection molding unit 20, the temperature adjustment unit 30b, the blow-molding unit 40, and the take-out unit 50.

The first injection molding unit 10, the first temperature adjustment unit 30a, the second injection molding unit 20, the second temperature adjustment unit 30b, the blow-molding unit 40, and the take-out unit 50 are arranged in this order to form six sides of a regular hexagon when viewed from above. Above these, there is provided a turntable 70 provided with a neck mold 60 (see FIG. 4A) for holding a neck portion 2a (see FIG. 4A) of the preform 1 molded by the injection molding unit 10. In the turntable 70, six sets of neck molds 60 are arranged to form six sides of a regular hexagon when viewed from above. Accordingly, the turntable 70 rotates counterclockwise by a predetermined angle (for example, 60 degrees) about a vertical axis on the first injection molding unit 10, the first temperature adjustment unit 30a, the second injection molding unit 20, the second temperature adjustment unit 30b, the blow-molding unit 40, and the take-out unit 50, so that each of the six sets of neck molds 60 sequentially moves the first injection molding unit 10, the first temperature adjustment unit 30a, the second injection molding unit 20, the second temperature adjustment unit 30b, the blow-molding unit 40, and the take-out unit 50, and each process is performed on the preform 1 held by the neck mold 60. Incidentally, in a case where the first temperature adjustment unit 30a is not provided, the first injection molding unit 10, the second injection molding unit 20, the second temperature adjustment unit 30b, the blow-molding unit 40, and the take-out unit 50 are arranged in this order to form five sides of a regular pentagon when viewed from above. When the turntable 70 rotates by a predetermined angle (for example, 72 degrees), each of five neck molds 60 sequentially moves each molding unit, and each process is performed on the preform 1 held by the neck mold 60.

The preform 1 used in the production apparatus 100 according to this embodiment is a two-layer preform in which the outer layer preform 3 is formed to be in close contact with the outside of the inner layer preform 2. The inner layer preform 2 is molded from a first synthetic resin material, and the outer layer preform 3 is molded from a second synthetic resin material. The first synthetic resin material and the second synthetic resin material are desirably different from each other. As the first synthetic resin material, a synthetic resin material (for example, polypropylene (PP), an ethylene-vinyl alcohol copolymer (EVOH), polyvinylidene chloride (PVDC), polyamide nylon (PA, Nylon MXD6), a cyclic olefin polymer (COC, COP), polyphenyl sulfone (PPSU), and polyether sulfone (PES)) excellent in physical properties such as moisture barrier properties, gas barrier properties, and chemical resistance can be used, and as the second synthetic resin material, a synthetic resin material (for example, polyethylene terephthalate (PET), polyethylene naphthalate (PEN), polycarbonate (PC), polystyrene (PS), and polyacrylonitrile (PAN)) excellent in physical properties such as moldability, toughness, creep resistance, and transparency can be used. Incidentally, although not essential, the melting point of the first synthetic resin material is desirably equal to or higher than the melting point of the second synthetic resin material.

As illustrated in FIG. 2A, the first injection molding unit 10 includes an injection core mold 11a for injection-molding the inner layer preform 2, an inner layer cavity mold 11b, and a first injection device 12, and is provided to injection-mold the inner layer preform 2.

When the inner layer preform 2 is injection-molded, the injection core mold 11a, the inner layer cavity mold 11b, and the neck mold 60 are combined to define a space corresponding to the inner layer preform 2. At this time, the inner surface shapes of the neck portion 2a, a body portion 2b, and a bottom portion 2x of the inner layer preform 2 are molded in the injection core mold 11a, the outer surface shapes of the body portion 2b and the bottom portion 2x are molded in the inner layer cavity mold 11, and the outer surface shape of the neck portion 2a is molded in the neck mold 60.

The first injection molding unit 10 is configured to mold the inner layer preform 2 by, for example, heating and melting a first synthetic resin material such as PP at a high temperature, injecting the melted first synthetic resin material between the injection core mold 11a and the inner layer cavity mold 11b, and the neck mold 60 by the first injection device 12, and cooling and solidifying the injected material to a temperature lower than the melting point.

The inner layer preform 2 which is injection-molded by the first injection molding unit 10 and then solidified to some extent is lifted up together with the turntable 70 while being held by the neck mold 60, is pulled out from the inner layer cavity mold 11, and is conveyed to the first temperature adjustment unit 30a when the turntable 70 rotates counterclockwise by 60 degrees.

As illustrated in FIG. 1, the first temperature adjustment unit 30a is disposed adjacent to the first injection molding unit 10, and includes a temperature control core mold and a temperature control cavity mold. The temperature control core mold and the temperature control cavity mold are cooled by a refrigerant flowing in a flow path formed inside. Since the temperature of the inner layer preform 2 conveyed to the first temperature adjustment unit 30a is too high to perform injection-molding of the outer layer preform 3 around the inner layer preform 2, the inner layer preform 2 is sandwiched between the cooled temperature control core mold and temperature control cavity mold to be further cooled (to be relatively cooled more than immediately after molding of the first injection molding unit 10), so that the temperature of the inner layer preform 2 is adjusted to a temperature further suitable for injection-molding. Incidentally, an air introducing/discharging rod may be used instead of the temperature control core mold. In this case, the inner layer preform 2 is cooled (temperature-controlled) by air circulating from the inside and by contact with the temperature control cavity mold from the outside.

The inner layer preform 2 of which the temperature is adjusted by the first temperature adjustment unit 30a is lifted up together with the turntable 70 while being held by the neck mold 60, is pulled out from the temperature control cavity mold, and is conveyed to the second injection molding unit 20 when the turntable 70 further rotates counterclockwise by 60 degrees as illustrated in FIG. 1.

As illustrated in FIG. 2B, the second injection molding unit 20 includes an injection core mold 21a for injection-molding the outer layer preform 3, an outer layer cavity mold 21b, and a second injection device 22 (see FIG. 1), and is provided to injection-mold the outer layer preform 3. The outer layer preform 3 does not have a neck portion but has only a body portion.

When the outer layer preform 3 is injection-molded, the inner layer preform 2 molded by the first injection molding unit 10 is housed in the outer layer cavity mold 21b, the injection core mold 21a is inserted into the inner surface side of the inner layer preform 2, and the inner layer preform 2, the outer layer cavity mold 21b, and the neck mold 60 are combined to define a space corresponding to the outer layer preform 3. At this time, the inner surface shapes of a body portion 3b and a bottom portion 3x (see FIG. 2C) of the outer layer preform 3 are formed on the outer surface of the inner layer preform 2, the outer surface shapes of the body portion 3b and the bottom portion 3x are formed in the outer layer cavity mold 21b, and the outer surface shape at the upper end of the body portion 3b is formed by the neck mold 60.

The second injection molding unit 20 is configured to mold the outer layer preform 3 by, for example, heating and melting a material such as a second synthetic resin such as PET at a high temperature, injecting the melted material between the inner layer preform 2 and the outer layer cavity mold 21b, and the neck mold 60 by the second injection device 22, and cooling and solidifying the injected material to a temperature lower than the melting point.

When the outer layer preform 3 is solidified to some extent after being injection-molded by the second injection molding unit 20, as illustrated in FIG. 2C, the outer layer preform 3 is in close contact with the outside of the inner layer preform 2 to form the two-layer preform 1.

The preform 1 is lifted up together with the turntable 70 while being held by the neck mold 60, is pulled out from the outer layer cavity mold 21, and is conveyed to the second temperature adjustment unit 30b when the turntable 70 rotates counterclockwise by 60 degrees.

As illustrated in FIG. 1, the second temperature adjustment unit 30b is disposed adjacent to the second injection molding unit 20, and includes a temperature control core mold and a temperature control cavity mold. The temperature control core mold and the temperature control cavity mold are cooled by a refrigerant flowing in a flow path formed inside. Since the temperature of the preform 1 conveyed to the second temperature adjustment unit 30b is too high for blow-molding, the preform 1 is sandwiched between the cooled temperature control core mold and temperature control cavity mold to be further cooled (to be relatively cooled more than immediately after molding of the second injection molding unit 20), so that the temperature of the preform 1 is adjusted to a temperature suitable for blow-molding. Incidentally, an air introducing/discharging rod may be used instead of the temperature control core mold. In this case, the preform 1 is cooled (temperature-controlled) by air circulating from the inside and by contact with the temperature control cavity mold from the outside.

The preform 1 of which the temperature is adjusted by the second temperature adjustment unit 30b is lifted up together with the turntable 70 while being held by the neck mold 60, is pulled out from the temperature control cavity mold, and is conveyed to the blow-molding unit 40 when the turntable 70 further rotates counterclockwise by 60 degrees as illustrated in FIG. 1.

The blow-molding unit 40 is disposed adjacent to the second temperature adjustment unit 30b and includes a blow cavity mold 41 (see FIG. 4C) and an air blowing member (not illustrated).

In the blow cavity mold 41, a mold surface corresponding to the shape of the container 1a is formed inside, and the mold surface is considerably larger than the temperature control cavity mold of the second temperature adjustment unit 30b.

The air blowing member is provided to supply and discharge air into and from the preform 1 inserted into the blow cavity mold 41. The air blowing member includes an air introducing/discharging member (blow core) which is in airtight contact with the neck portion 2a of the preform 1 and supplies and discharges high pressure air having a predetermined pressure (for example, 0.5 MPa or more and 3.5 MPa or less) into and from the body portion of the preform 1, and a stretch rod which abuts on the inner surface of the bottom portion of the preform 1 and moves up and down.

The preform 1 conveyed to the blow-molding unit 40 is lowered together with the turntable 70 and inserted into the blow cavity mold 41 (see FIG. 4C), and the stretch rod of the air blowing member is inserted into the inner layer preform 2. At this time, the air introducing/discharging member is connected to the opening of the neck portion 2a of the preform 1 (more specifically, the inner layer preform 2), and the tip of the stretch rod advances to the bottom of the blow cavity mold 41 while hitting the bottom portion of the preform 1 (more specifically, the inner layer preform 2), so that the preform 1 is extended toward the bottom surface of the blow cavity mold 41 (the preform 1 is extended in the vertical direction). Further, when the air introducing/discharging member blows air (high pressure air) into the preform 1 (more specifically, the inner layer preform 2), the body portion of the preform 1 is expanded (the body portion of the preform 1 is extended in the outer diameter direction) until the entire outer surface of the body portion of the preform 1 (more specifically, the outer layer preform 3) is pressed in close contact with the mold surface of the blow cavity mold 41, and the container 1a is molded. After the molding is completed, air is exhausted from the container 1a via the air introducing/discharging member, and the air blowing member (the air introducing/discharging member and the stretch rod) moves to the upper side of the neck mold 60 and is separated from the container 1a.

The container 1a blow-molded by the blow-molding unit 40 is lifted up together with the turntable 70 while being held by the neck mold 60, is pulled out from the blow cavity mold 41, and is conveyed to the take-out unit 50 when the turntable 70 further rotates counterclockwise by 60 degrees.

The take-out unit 50 is disposed between the blow-molding unit 40 and the injection molding unit 10. In the take-out unit 50, the neck mold 60 is opened, and the container 1a is not held, so that the container 1a falls, and the container 1a is extracted from the production apparatus 100. The production apparatus 100 is configured to mold the preform 1 and the container 1a by the above flow.

Hereinafter, an injection-molding process and a blow-molding process will be described in more detail.

First, as illustrated in FIG. 2A, the first injection molding unit 10 injects an inner layer resin (first synthetic resin material) such as PP into the inner layer cavity mold 11 which is a part of an inner layer injection-molding mold to injection-mold the inner layer preform 2. Next, as illustrated in FIG. 2B, the second injection molding unit 20 disposes the injection-molded inner layer preform 2 in the outer layer cavity mold 21 which is a part of an outer layer injection-molding mold. Next, the outer layer preform 3 is injection-molded by injecting an outer layer resin (second synthetic resin material) such as PET via a gate portion 23 formed at the center of the bottom surface between the outer layer cavity mold 21 and the inner layer preform 2 with the inner layer preform 2 disposed in the outer layer cavity mold 21.

The outer layer cavity mold 21 includes a protrusion 24 having a predetermined shape (for example, a cylindrical shape or an elongated protruding rib shape) on a bottom surface (cavity surface) corresponding to the bottom portion 3x of the outer layer preform 3. Accordingly, the inner layer preform 2 disposed in the outer layer cavity mold 21 is brought into close contact with the end surface of the protrusion 24, and a gap is formed by the width of the height of the protrusion 24 between the inner layer preform 2 and the bottom surface of the outer layer cavity mold 21. Since the gap is filled with an outer layer resin such as PET which is a material of the outer layer preform 3, in the injection-molded outer layer preform 3, a through-hole (or a thin film portion for a through-hole) 3a functioning as a vent hole is formed in the bottom portion 3d as illustrated in FIG. 2C. In the preform 1, the through-hole 3a is formed in the outer layer preform 3, thus a through-hole 3a' having substantially the same shape as the through-hole 3a is formed in the bottom portion of the container 1a, and external air can flow through the through-hole 3a' between an inner layer bottle 2' (see FIG. 4C) and an outer layer bottle 3' (see FIG. 4C).

Figure 4A:
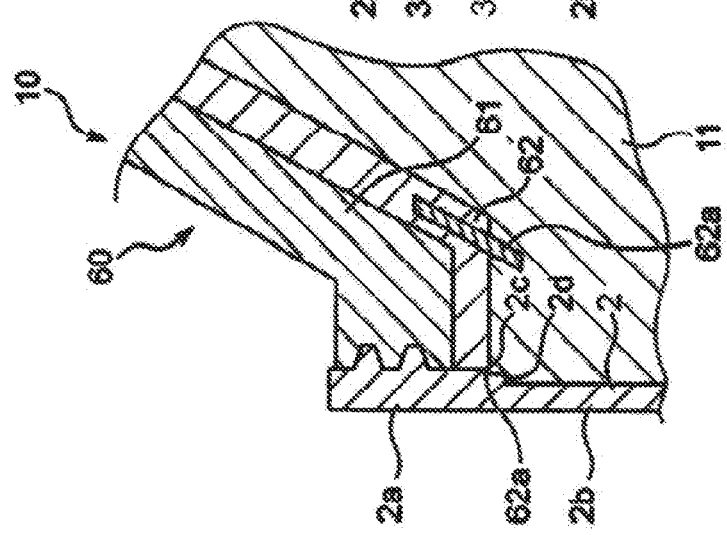
FIG. 4A is a cross-sectional view when the inner layer preform is injection-molded.
Figure 4B:
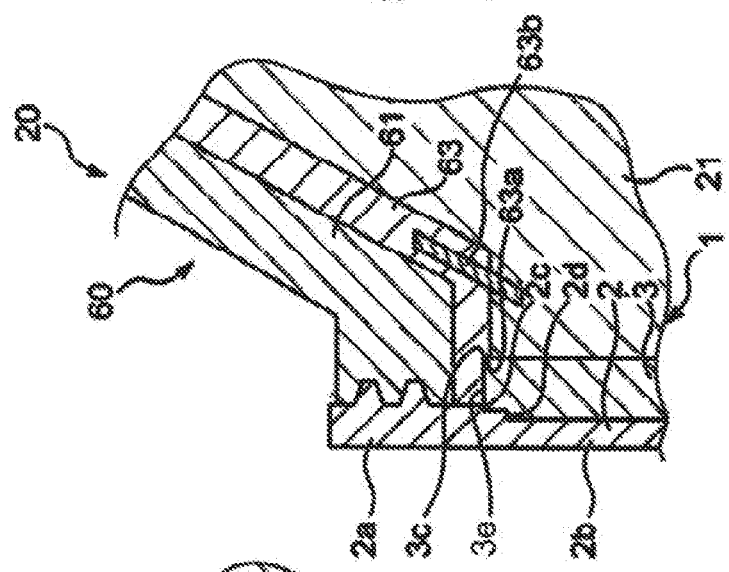
FIG. 4B is a cross-sectional view when an outer layer preform is injection-molded.
Figure 4C:
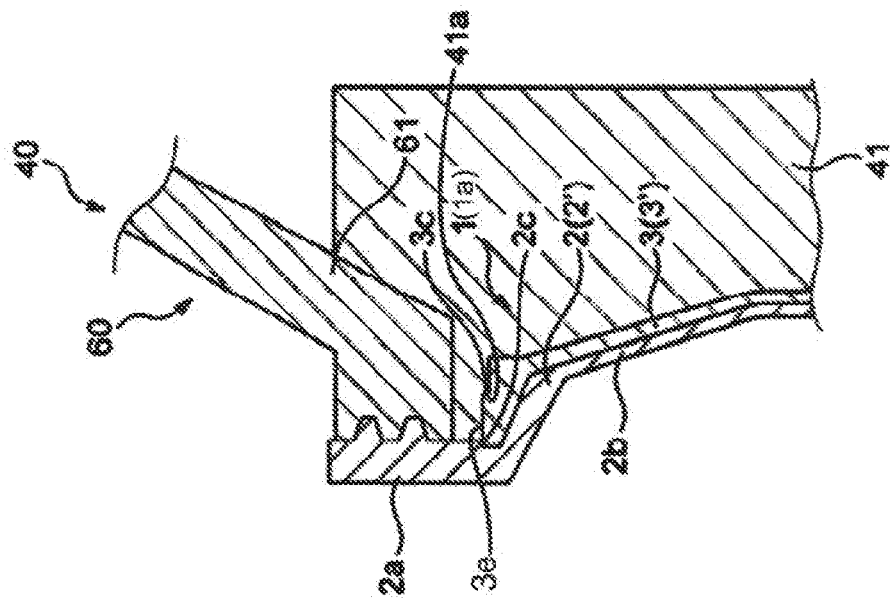
FIG. 4C is a cross-sectional view when blow-molding is performed.

FIG. 4A is a cross-sectional view when the inner layer preform is injection-molded, FIG. 4B is a cross-sectional view when the outer layer preform is injection-molded, and FIG. 4C is a cross-sectional view when blow-molding is performed.

In the neck mold 60 according to this embodiment, the shape of the mold surface formed on the inner peripheral surface changes when the inner layer preform is injection-molded, when the outer layer preform is injection-molded, and when blow-molding is performed.

As illustrated in FIG. 4A, the neck mold 60 for injection-molding the inner layer preform 2 is configured such that a neck mold main body 61 provided on the turntable 70 and an inner layer neck mold 62 provided on the inner layer cavity mold 11 are brought into contact with each other.

The neck mold main body 61 is a mold for forming most of the neck portion 2a of the inner layer preform 2, and a mold surface is formed to form a cylindrical portion and a screw portion formed on the surface of the cylindrical portion.

The inner layer neck mold 62 is provided to form a region between the lower region of the neck portion 2a, that is, a region where the neck mold main body 61 forms between the neck portion 2a and the body portion 2b of the inner layer preform 2. The inner layer neck mold 62 has a cylindrical inner peripheral surface, and a lower end portion protrudes toward an axis C over the entire circumference along the inner peripheral surface. Accordingly, in the inner layer preform 2, the lower end of the neck portion 2a becomes thin toward the axis C over the entire circumference, and a diameter becomes small, so that a first abutting surface (first recess) 2c is formed. Incidentally, the inner layer neck mold 62 is formed such that a lower end surface is widened perpendicularly to the axis C of the preform 1, and the lower end surface abuts on the inner layer cavity mold 11 to form a mold surface which forms the outer surface of the inner layer preform 2. Further, at this time, a second abutting surface (second recess) 2d is also formed on the outer peripheral surface of the body portion 2b of the inner layer preform 2 due to the mold surface shape of the inner layer cavity mold 11. The first abutting surface (first recess) 2c and the second abutting surface (second recess) 2d have a stepped shape (a shape recessed toward the axis C). The shape functions as a support portion for holding the inner layer preform 2 or the inner layer bottle 2' to the outer layer preform 3 or the outer layer bottle 3' during blow-molding of the preform 1 or during use of the container 1a. Further, the inner layer neck mold 62 is connected to the inner layer cavity mold 11 via a guide member 62a to be slidable in an oblique direction. The guide member 62a has a guide rod and a compression spring, which are inserted into recesses (recessed holes) of the inner layer neck mold 62 and the inner layer cavity mold 11. With the above configuration, the outer layer neck mold 63 is moved obliquely upward by the force of the compression spring when the mold is opened, and is moved obliquely downward by being pushed by the neck mold main body 61 when the mold is closed.

As illustrated in FIG. 4B, the neck mold 60 for injection-molding the outer layer preform 3 is configured such that the neck mold main body 61 provided on the turntable 70 and the outer layer neck mold 63 provided on the outer layer cavity mold 21 are brought into contact with each other.

The outer layer neck mold 63 has a cylindrical inner peripheral surface, and the inner peripheral surface forms the lower region of the neck portion 2a of the inner layer preform 2. The lower surface of the outer layer neck mold 63 is formed in a shape in which a portion close to the axis C of the preform 1 is thinner than other portions at one stepwise. Specifically, the outer layer neck mold 63 is formed such that a portion abutting on the neck portion 2a of the inner layer preform 2 and a portion in the vicinity thereof are positioned in the same plane as the first abutting surface (first recess) 2c of the inner layer preform 2. On the other hand, the outer layer neck mold 63 is thick at a position away from the inner layer preform 2, and at a position where the thickness changes from thin to thick, a step surface extending along the axis C of the preform 1 and facing the inner layer preform 2 is formed as a cylindrical inner peripheral surface in the outer layer neck mold 63. Incidentally, the outer layer neck mold 63 is formed such that a lower end surface is widened perpendicularly to the axis C of the preform 1, and the lower end surface abuts on the outer layer cavity mold 21 to form a mold surface which forms the outer peripheral surface of the outer layer preform 3. At this time, in the outer layer cavity mold 21, a mold surface forming the outer peripheral surface of the outer layer preform 3 is formed to be flush with a step surface 63a. Accordingly, a convex upper end outer peripheral surface 3c is formed at the upper end of the outer layer preform 3. Further, the outer layer neck mold 63 is disposed to be slidable in an oblique direction with respect to the outer layer cavity mold 21 by a guide member 63b.

At the time of blow-molding, as illustrated in FIG. 4C, the upper end outer peripheral surface 3c formed around the upper end of the outer layer preform 3 may abut on the blow cavity mold 41. Accordingly, the upper end outer peripheral surface 3c abuts on a step surface 41a and thus, the upper end outer peripheral surface is prevented from being widened in a direction away from the axis C. Accordingly, the air flowing in through the neck portion 2a at the time of blow-molding cannot push and widen the outer layer preform 3 in a direction away from the axis C, and thus a state where the first abutting surface 2c of the inner layer preform 2 and an upper end surface 3e of the outer layer preform 3 abut on each other in the axis C direction is maintained, so that the inner layer preform 2 is held not to move toward the bottom portion along the axis C with respect to the outer layer preform 3.

Hereinafter, a procedure of injection-molding the two-layer preform 1 and blow-molding the same into the container 1a will be described.

When the container 1a is produced, first, the inner layer preform 2 is injection-molded by the inner layer cavity mold 11 of the first injection molding unit 10. At this time, the inner layer preform 2 including the first abutting surface (first recess) 2c and the second abutting surface (second recess) 2d on the lower outer peripheral surface of the neck portion 2a is molded by the inner layer neck mold 62 and the inner layer cavity mold 11. Incidentally, the material (first synthetic resin material) of the inner layer preform 2 is desirably a material which is easily deformed, for example, a synthetic resin such as PP. (First injection-molding process)

When the inner layer preform 2 is injected, the molded inner layer preform 2 is conveyed and disposed in a temperature control pot mold (not illustrated) of the first temperature adjustment unit 30a. Accordingly, the inner layer preform 2 is adjusted and cooled to a temperature further suitable for injection-molding (temperature control process).

When the inner layer preform 2 is adjusted and cooled to the temperature suitable for injection-molding, the molded inner layer preform 2 is conveyed into the outer layer cavity mold 21 and disposed in the outer layer cavity mold 21. When the inner layer preform 2 is disposed in the outer layer cavity mold 21, the outer layer preform 3 is injection-molded on the outer surface of the inner layer preform 2. At this time, the outer layer preform 3 is engaged with the first abutting surface (first recess) 2c and the second abutting surface (second recess) 2d of the inner layer preform 2. Further, the outer layer neck mold 63 and the outer layer cavity mold 21 form the upper end outer peripheral surface 3c and the through-hole 3a. Thus, the inner and outer two-layer preform 1 is molded. Incidentally, the material (second synthetic resin material) of the outer layer preform 3 is desirably a material capable of increasing the rigidity of the container 1a, for example, a synthetic resin such as PET (second injection-molding process).

When the preform 1 is molded, the molded preform 1 is conveyed and disposed in a temperature control pot mold (not illustrated) of the second temperature adjustment unit 30b. Accordingly, the preform 1 is adjusted and cooled to a temperature suitable for blow-molding (temperature control process).

When the preform 1 is adjusted and cooled to the temperature suitable for blow-molding, the preform 1 of which the temperature is adjusted is conveyed and disposed in the blow cavity mold 41 of the blow-molding unit 40. The preform 1 is blow-molded by high pressure air and a stretch rod (not illustrated) to produce the container 1a. At this time, the separation (falling off, misalignment, detachment) of the inner layer preform 2 and the outer layer preform 3 is suppressed by the stepped support portion including the first abutting surface (first recess) 2c (blow-molding process). In addition, by providing the stepped support portion including the second abutting surface (second recess) 2d, the separation of the inner layer preform 2 and the outer layer preform 3 can be further suppressed.

After the container 1a is conveyed to the take-out unit 50, the neck mold 60 is opened to collect the container 1a (take-out process).

The support portion provided in the preform 1 can suppress the ease of detachment (separation, falling off, misalignment) of the inner layer preform 2 and the outer layer preform 3 during blow-molding. In addition, at the time of consumption of the contents, outside air is introduced between the inner layer bottle 2' and the outer layer bottle 3' from the through-hole 3a' of the container 1a, and the inner layer bottle 2' peels off from the outer layer bottle 3' while maintaining a reduced-volume/shrunk state. However, also in this case, the ease of detachment of the inner layer bottle 2' and the outer layer bottle 3' can be suppressed by the support portion. In the case of the container 1a, the support portion (first abutting surface (first recess) 2c) of the inner layer bottle 2' is held or engaged in the upper portion (upper surface) of the outer layer bottle 3', thereby preventing the ease of detachment. Further, it is possible to easily form the vent hole (through-hole 3a) necessary for the delamination container in the injection-molding process. In addition, since the neck portion 2a can be molded with high dimensional accuracy, airtightness between the neck portion 2a and the extraction plug can be improved as compared with a container produced by an extrusion blow type blow-molding method, the deterioration of contents can be suppressed, and a remaining amount can be reduced. Therefore, the delamination container can be suitably produced by hot parison type blow-molding.

According to the above procedure, the two-layer preform 1 including the inner layer preform 2 and the outer layer preform 3 is injection-molded to produce the two-layer container 1a.

In the production apparatus 100 according to this embodiment, the protrusion 24 for separating the inner layer preform 2 disposed in the outer layer cavity mold 21 from the bottom surface is provided on the bottom surface of the outer layer cavity mold 21. Accordingly, it is possible to form the through-hole 3a penetrating only the outer layer preform 3 without providing a process for perforating only the outer layer preform 3 after blow-molding. Therefore, the two-layer delamination container can be easily produced by a hot parison type blow-molding method.

In the neck mold 60 of the production apparatus 100, the shape of the mold surface when the inner layer preform 2 is injection-molded is different from that when the outer layer preform 3 is injection-molded. Accordingly, even when the neck mold 60 in which the inner layer preform 2 is injection-molded continues to hold the preform 1 until a time after blow-molding, injection-molding can be performed such that the inner layer preform 2 and the outer layer preform 3 have different shapes, and the first abutting surface 2c and the like can be easily molded in the preform 1. Therefore, even in a case where the difference in the amount of shrinkage after injection-molding between the resin used for molding the inner layer preform 2 and the resin used for molding the outer layer preform 3 is large, it is possible to prevent the inner layer preform 2 from being detached from the outer layer preform 3 or from being displaced in position during blow-molding. In addition, even in the case of the container 1a in which the inner layer bottle can be reduced in volume, and the contents can be sufficiently consumed, it is possible to prevent the inner layer bottle from being detached from the outer layer bottle when the container 1a is used.

Figures 5A, 5B, 5C:
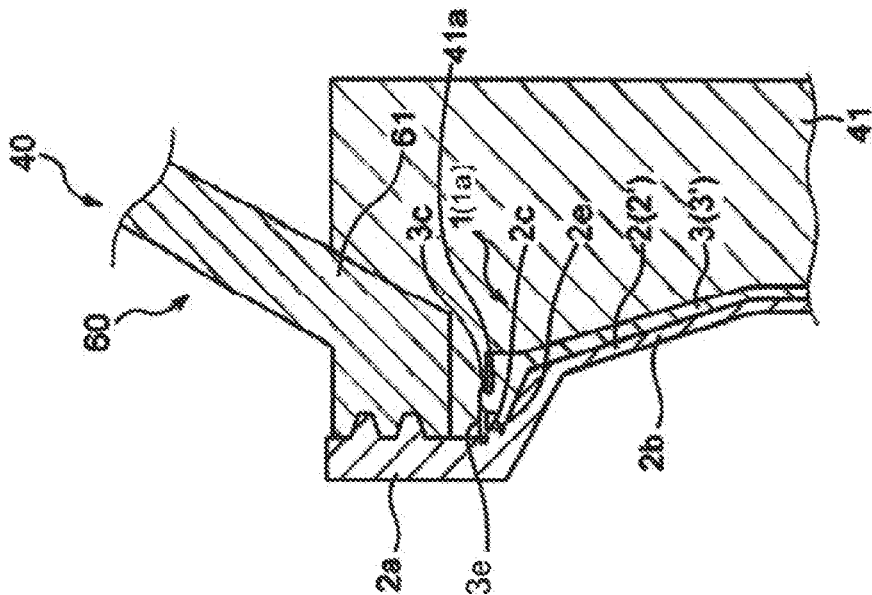
FIG. 5A is a cross-sectional view when the inner layer preform is injection-molded.
FIG. 5B is a cross-sectional view when the outer layer preform is injection-molded.
FIG. 5C is a cross-sectional view when blow-molding is performed.
Figure 6B:
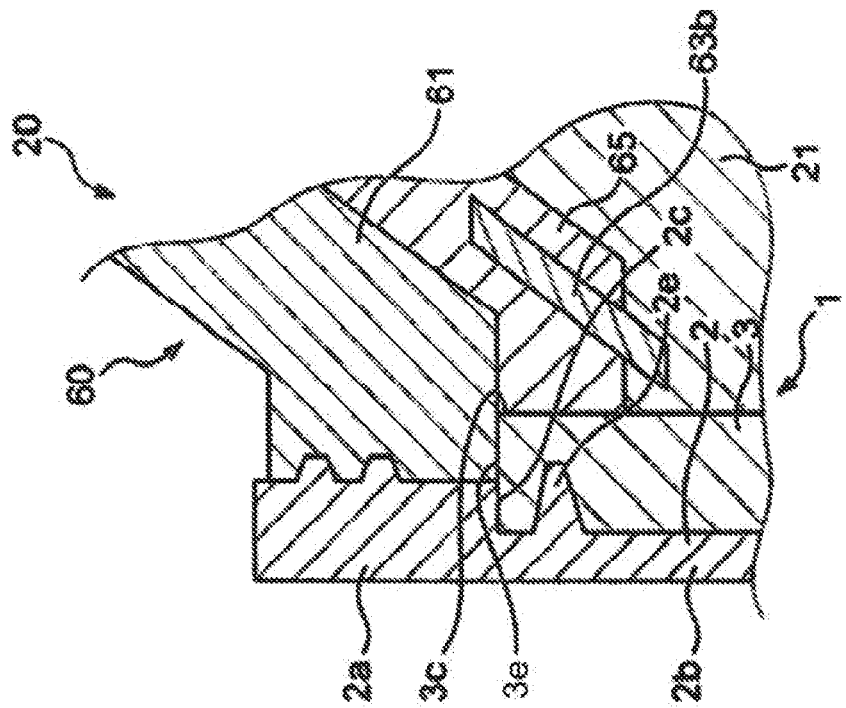
FIG. 6B illustrates the neck mold when the outer layer preform is injection-molded and blow-molded.
Figure 6A:
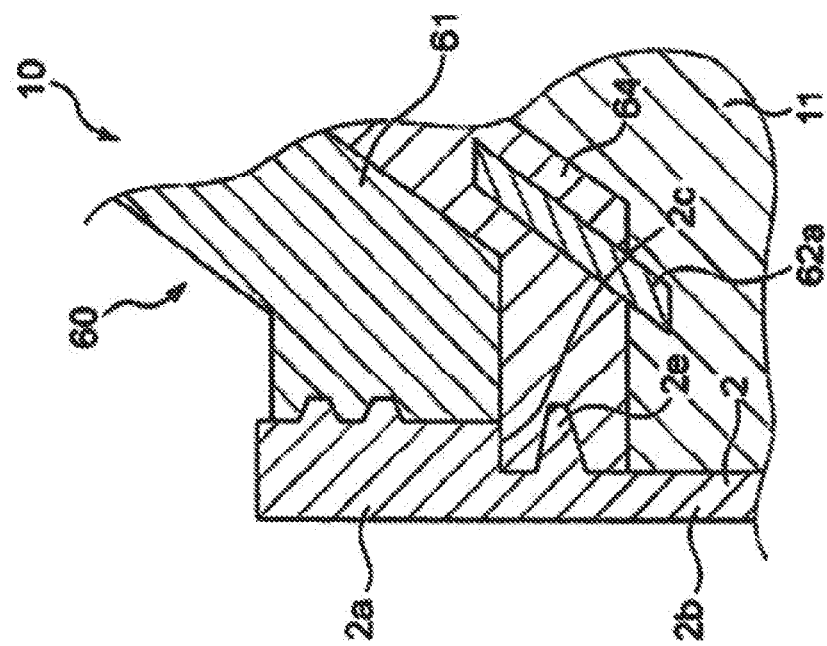
FIG. 6A illustrates a neck mold when the inner layer preform is injection-molded.
Figure 7B:
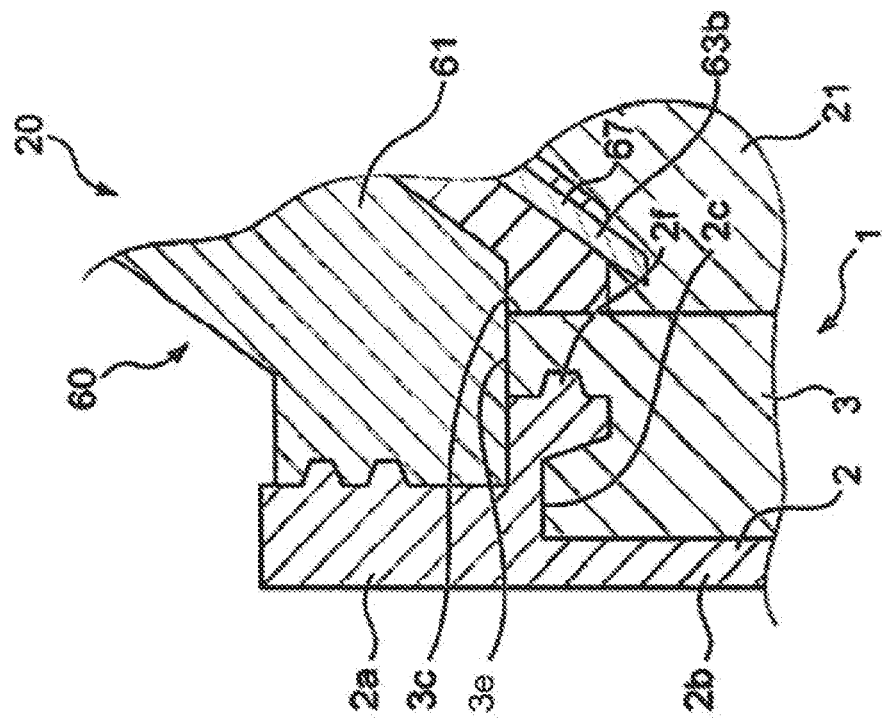
FIG. 7B illustrates the neck mold when the outer layer preform is injection-molded and blow-molded.
Figure 7A:
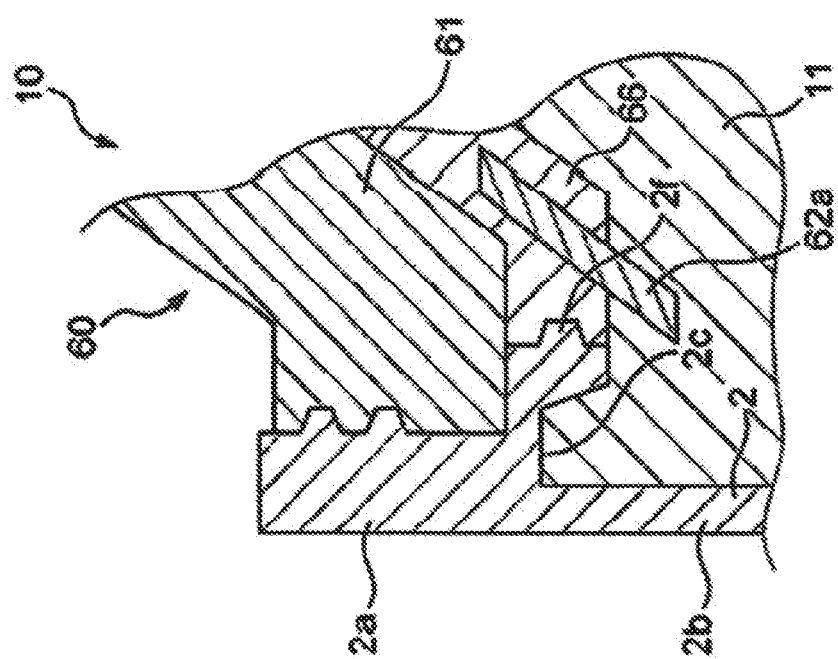
FIG. 7A illustrates the neck mold when the inner layer preform is injection-molded.

Although the present invention has been described above on the basis of the embodiment, the present invention is not limited thereto. For example, in the above-described embodiment, only the first abutting surface 2c is formed in the inner layer preform 2 in order to prevent the inner layer preform 2 from being detached from the outer layer preform 3, but the present invention is not limited thereto. For example, as illustrated in FIG. 5A, a convex portion 2e may be further formed in the inner layer preform 2 by the inner layer neck mold 62 and the inner layer cavity mold, and as illustrated in FIG. 5B, when the outer layer preform 3 is injection-molded, a part of the outer layer preform 3 may be interposed between the convex portion 2e and the outer layer neck mold 63, and a container as illustrated in FIG. 5C may be molded. Further, as illustrated in FIG. 6A, the convex portion 2e may be formed by the inner layer neck mold 64, and as illustrated in FIG. 6B, when the outer layer preform 3 is injection-molded, the convex portion 2e may be sandwiched directly from the side with the outer layer neck mold 65. Further, as illustrated in FIG. 7A, when a convex portion 2f may be formed at a position away from the axis C by the inner layer neck mold 66 and the inner layer cavity mold, and the wide first abutting surface 2c may be formed from the convex portion 2f to the axis C, and as illustrated in FIG. 7B, when the outer layer preform 3 is injection-molded, the convex portion 2f and the first abutting surface 2c may be sandwiched directly from the side with the outer layer neck mold 67 in a state where the convex portion 2f is fitted to the outer layer preform 3, and the first abutting surface 2c abuts on the outer layer preform 3 in a wide range. In the case of FIGS. 5A to 5C, 6A to 6B 7A and 7B, the convex portion 2e and the convex portion 2f also function as a support portion that suppresses the ease of detachment (separation, falling off, misalignment) of the inner layer preform 2 and the outer layer preform 3, or the inner layer bottle 2' and the outer layer bottle 3' (the convex portions 2e and 2f of the inner layer preform 2 or inner layer bottle 2' are engaged in the upper portion of the outer layer preform or outer layer bottle 3' so as to prevent the ease of detachment). Further, the materials of the inner layer preform 2 and the outer layer preform 3 may be set as a virgin material (first synthetic resin material) and a recycled material (second synthetic resin material), respectively. In this case, the virgin material (first synthetic resin material) and the recycled material (second synthetic resin material) may be the same kind of material (for example, PET, PEN, PP, PC, and the like). Since the weight ratio of the outer layer preform 3 in the preform 1 is large, it is possible to contribute to the problem of waste plastic while ensuring safety and hygiene.

Figure 8A:
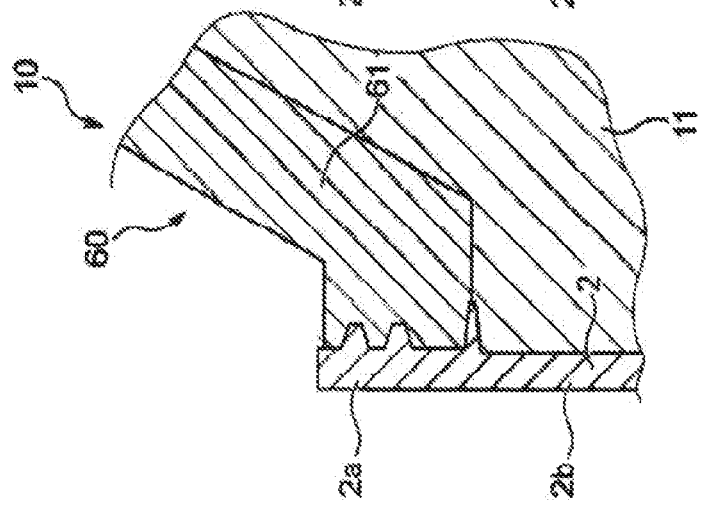
FIG. 8A is a cross-sectional view when the inner layer preform is injection-molded.
Figure 8B:
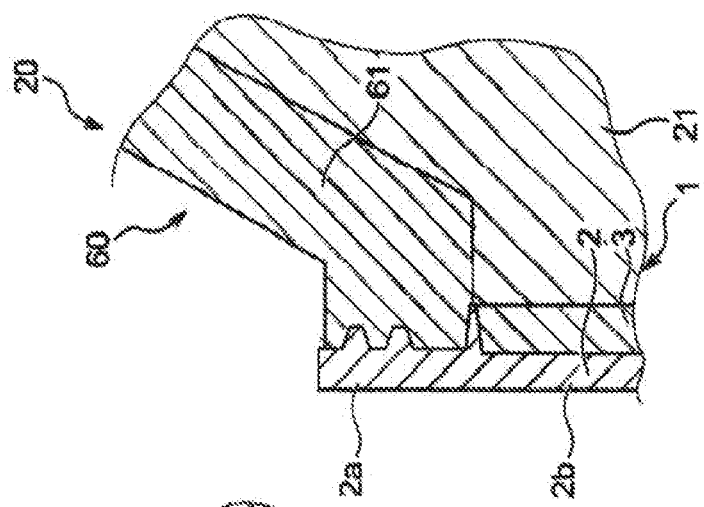
FIG. 8B is a cross-sectional view when the outer layer preform is injection-molded.
Figure 8C:
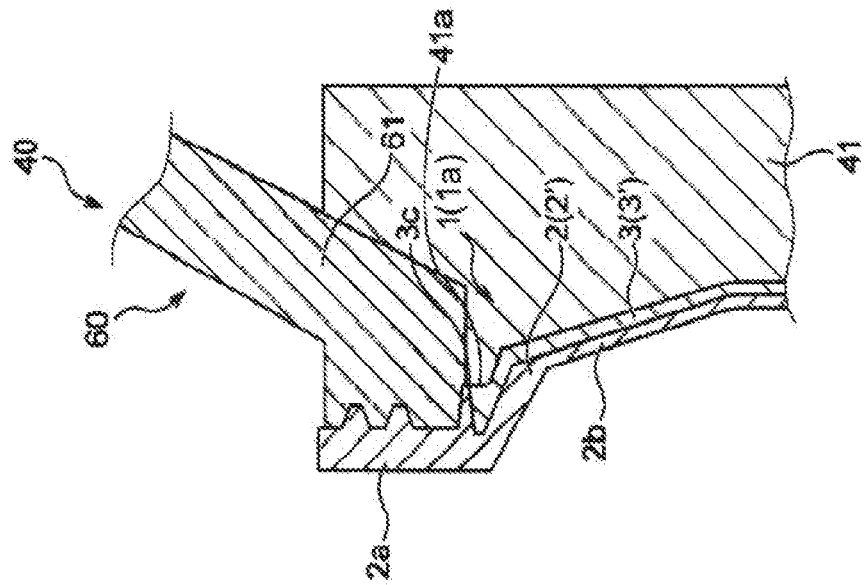
FIG. 8C is a cross-sectional view when blow-molding is performed.

As illustrated in FIGS. 4A to 7B, the production apparatus 100 according to the above-described embodiment produces the two-layer preform 1 or container 1a having an undercut such as the upper end surface 3e and the convex portion 2e under the neck portion 2a by the neck mold (specifically, the inner layer neck mold 62 and the outer layer neck mold 63) having a double structure, but the invention is not limited thereto. For example, as illustrated in FIGS. 8A to 8C, the production apparatus 100 may be an apparatus that produces the two-layer preform 1 or container 1a using a normal neck mold which does not have a double structure without any undercut under the neck portion 2a. In any of the production apparatuses 100, the through-hole for ventilation can be molded in the bottom portion of the two-layer preform 1 or container 1a by a single apparatus by using a mold having a protrusion on the bottom surface of the outer layer cavity mold 21.

The invention claimed is:

1. A production apparatus of a two-layer preform including an inner layer preform and an outer layer preform, the apparatus comprising:
   a first injection molding unit configured to injection-mold the inner layer preform with a first resin material;
   a second injection molding unit configured to internally accommodate the inner layer preform that is injection molded in the first injection molding unit and injection-mold the outer layer preform on the outside of the inner layer preform with a second resin material having a lower melting point than the first resin material, and a neck mold that molds a neck portion of the preform, wherein the first injection molding unit has a first injection core mold applied to injection molding of the inner layer preform, the second injection molding unit has a second injection core mold applied to injection molding of the inner layer preform and is different from the first injection core mold, and an outer layer cavity mold for injection-molding the outer layer preform, a bottom surface of the outer layer cavity mold is provided with a protrusion for separating the inner layer preform disposed in the outer layer cavity mold from the bottom surface, and the inner layer preform is supported by the neck mold and conveyed to the second injection molding unit.

2. The production apparatus of the two-layer preform according to claim 1, wherein a shape of a mold surface of the neck mold when the inner layer preform is injection-molded is different from a shape of the mold surface when the outer layer preform is injection-molded.

3. The production apparatus of the two-layer preform according to claim 1, wherein an abutting surface which is narrowed around an axis of the inner layer preform and abuts on the outer layer preform is formed between a neck portion and a body portion of the inner layer preform.

* * * * *